US008351114B2

(12) United States Patent
Nelson et al.

(10) Patent No.: US 8,351,114 B2
(45) Date of Patent: Jan. 8, 2013

(54) SYSTEM AND METHOD FOR COMBINING MULTIPLE FIBER AMPLIFIERS OR MULTIPLE FIBER LASERS

(75) Inventors: Burke E. Nelson, Albuquerque, NM (US); Sami A. Shakir, Albuquerque, NM (US); William R. Culver, Albuquerque, NM (US); Yuji S. Starcher, Albuquerque, NM (US); Jerry W. Hedrick, Arnold, MD (US); George M. Bates, Burke, VA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 360 days.

(21) Appl. No.: 12/320,681

(22) Filed: Feb. 2, 2009

(65) Prior Publication Data
US 2010/0195195 A1    Aug. 5, 2010

(51) Int. Cl.
*H04B 10/17* (2006.01)
*G02B 6/26* (2006.01)
*G02B 6/32* (2006.01)

(52) U.S. Cl. ........ 359/349; 359/341.5; 385/43; 385/115
(58) Field of Classification Search .......... 359/349, 359/341.4; 385/43, 115
See application file for complete search history.

(56) References Cited

U.S. PATENT DOCUMENTS

| | | | |
|---|---|---|---|
| 5,864,644 A * | 1/1999 | DiGiovanni et al. | 385/43 |
| 5,935,288 A * | 8/1999 | DiGiovanni et al. | 65/408 |
| 6,167,075 A * | 12/2000 | Craig et al. | 372/75 |
| 6,366,356 B1 * | 4/2002 | Brosnan et al. | 356/477 |
| 6,397,636 B1 * | 6/2002 | DiGiovanni et al. | 65/395 |
| 6,990,278 B2 * | 1/2006 | Vakili et al. | 385/46 |
| 7,130,113 B2 * | 10/2006 | Shakir et al. | 359/349 |
| 2002/0054740 A1 * | 5/2002 | Vakili et al. | 385/115 |
| 2004/0165827 A1 * | 8/2004 | Bruesselbach et al. | 385/46 |
| 2007/0212006 A1 * | 9/2007 | Wysocki | 385/115 |

OTHER PUBLICATIONS

Shakir, S. A., "Coherent Combining of Fiber Arrays Using Passive Phasing", LEOS 2008 (published by IEEE), p. 872-3, Nov. 9-13, 2008.*

* cited by examiner

*Primary Examiner* — Eric Bolda
(74) *Attorney, Agent, or Firm* — Andrews Kurth LLP

(57) ABSTRACT

A system for combining multiple fiber amplifiers, or multiple fiber amplifiers. The system includes a fiber combiner with multiple cores for connecting with the multiple fiber amplifiers and for combining the beams of the fiber amplifiers into a single beam. The fiber amplifiers are aligned, tapered, and stretched.

A method for combining fiber amplifiers includes emitting a beam from a tapered fiber combiner and transmitting and coupling a portion of the emitted beam back into the fiber combiner via a feedback fiber. The transmission and coupling of the feedback fiber includes mixing the feedback fiber with the output of an auxiliary laser and boosting the feedback fiber by a pre-amplifier. The feedback fiber is split into a plurality of beams by a fiber splitter. The beams are fed into an array of fiber amplifiers and combined with output of the individual fiber amplifiers to form the tapered fiber combiner.

10 Claims, 10 Drawing Sheets

SYSTEM AND METHOD FOR COMBINING MULTIPLE FIBER AMPLIFIERS OR MULTIPLE FIBER LASERS

BACKGROUND

High power lasers (e.g., 100 kW) are important for use in numerous industrial and military applications. For example, high power lasers are necessary in industrial applications such as materials processing and metal welding. However, increasing the power of the lasers has been impeded by thermal effects which cause the laser beam quality to deteriorate, thereby limiting the effectiveness of the high power laser beam. Prior art solutions to this problem include using solid-state lasers such as fiber lasers. Fiber lasers are less prone to thermal effects on laser beam quality. However, due to the small size of the fiber lasers' cross-sections, fiber laser power scaling has been limited to less than 10 kW due to optical damage and nonlinear effects such as dust, particles in the atmosphere, etc.

A number of techniques may be used to combine the fiber amplifiers (or fiber lasers), such as coherent or incoherent combining techniques. The coherent combining techniques fall into two categories: active phasing and passive phasing. In coherent combining techniques, the beams are coherent and in phase with each other (i.e., locked together). Once such prior attempt to combine a plurality of fiber amplifiers and lasers to increase the power of fiber lasers was made in U.S. Pat. No. 7,274,717. Passive phasing was used along with a fiber combiner to couple a plurality of laser beams' output from individual fiber amplifiers. The drawbacks of this system include a weak feedback signal, which could cause instabilities in the operation of the system. Furthermore, at high power, the system undergoes coupling changes due to thermal effects at the fiber combiner, preventing the scaling to high power.

Active phasing methods include correcting the phase of the individual amplifiers by an electro-optical phase modulator to ensure that the output beams of the individual amplifiers are in phase. Other prior art attempts to combine multiple fiber lasers or amplifiers use active phase detection and control such as in U.S. Pat. No. 6,708,003, and T. M. Shay et al., (Proceedings of the SPEE, Vol. 5550, pp. 313-9 (2004)). A major disadvantage of active phasing techniques is that the system of fiber amplifiers and master oscillator need to be operated at a narrow linewidth ranging from 10 kHz to 100 kHz. This severely limits the power limitation of each fiber amplifier because of Stimulated Brillouin scattering (SBS). This is not an issue in passive phasing because the system runs broadband, which mitigates SBS.

In incoherent combining methods, also called spectral beam combining, the beams do not have to be locked or phased together, but are manipulated by a prism or a grating so that they share a common aperture. Spectral combining has been proposed, for example, in U.S. Pat. Nos. 6,697,192, 6,327,292, 6,208,679, and 6,192,062. A disadvantage of spectral beam combining is that the individual fiber amplifiers are limited in power due to Simulated Brillouin Scattering (SBS). The spectral beam combining method employs gratings, which are very sensitive to thermal effects. Thermal effects cause the beam quality of the output beam to deteriorate. Since the beams have to be aligned and maintained in free-space to angular tolerances of micro-radians, this is an added problem. Accordingly, there is a need for a laser system that can deliver sufficient power levels while retaining high beam quality.

SUMMARY

An advantage of the embodiments described herein is that they overcome the disadvantages of the prior art. Another advantage of certain embodiments is an improved laser beam intensity.

These advantages and others are achieved by a system for combining multiple fiber amplifiers or fiber lasers. The system includes a fiber combiner with multiple cores for connecting with the multiple fiber amplifiers and for combining the beams of the fiber amplifiers into a single beam. The fibers from the multiple fiber amplifiers are aligned, tapered, and stretched into a tapered fiber combiner.

These advantages and others are also achieved by a method for combining fiber amplifiers which includes emitting a beam from a tapered fiber combiner and coupling a portion of the emitted beam back into the multiple fiber amplifiers via a feedback fiber. The feedback fiber is coupled with the output of an auxiliary laser and the beam in the feedback fiber is boosted by a pre-amplifier. The feedback fiber is split into a plurality of beams by a fiber splitter. The beams are fed by fiber into the multiple fiber amplifiers and combined into a single beam via the tapered fiber combiner.

DESCRIPTION OF THE DRAWINGS

The detailed description will refer to the following drawings, wherein like numerals refer to like elements, and wherein:

FIG. 6 shows an experimental far-field beam intensity profile of the mode intensity distribution of the central core when only the central fiber is turned on;

DETAILED DESCRIPTION

Described herein are a system and method for combining multiple high power fiber lasers or multiple fiber amplifiers. Embodiments described herein combine a number of fibers, including fiber amplifiers or fiber lasers, into a single output fiber. Embodiments make use of passive phasing described in U.S. Pat. No. 7,130,113, which is hereby incorporated by reference. Embodiments described herein coherently combine the output of plural high power fiber amplifiers, or fiber lasers, into a single high power beam. The output of single mode fibers of the high power fiber amplifiers or fiber lasers are connected to a special tapered fiber combiner with multiple cores. The fiber combiner combines the beams of the fiber amplifiers or lasers into a single beam. The end result of such embodiments is a single fiber combiner with the same number of cores but with scaled down core separation and core sizes.

Figure 1A:
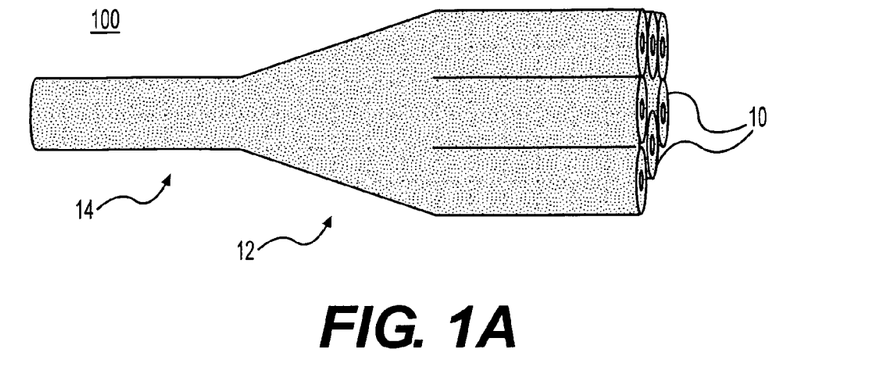
FIGS. 1A-1D show various views of components of an embodiment of a system for combining multiple fiber lasers or fiber amplifiers.
Figure 1B:
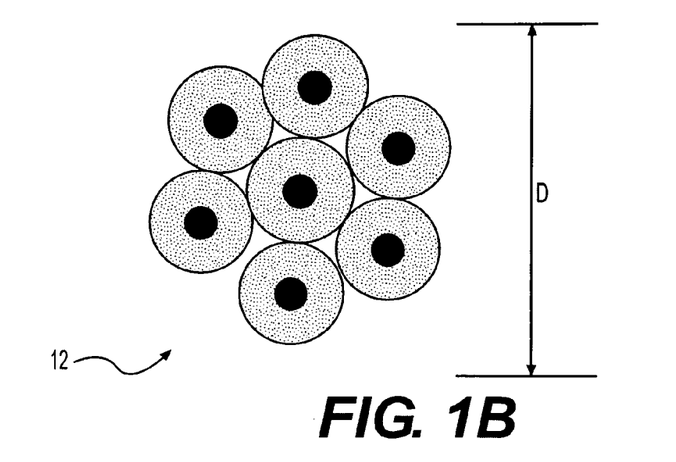
Figure 1C:
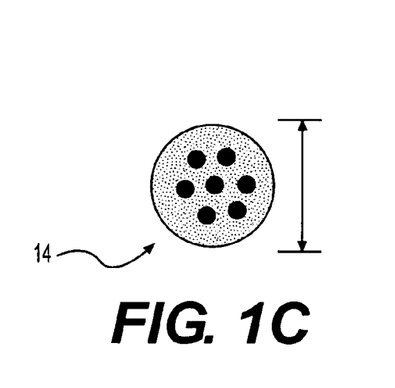
Figure 1D:
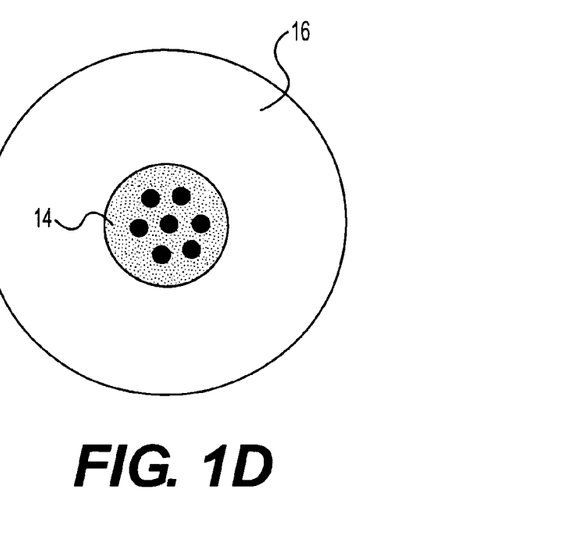

Referring now to FIGS. 1A-1D, shown is an embodiment of system 100 for combining multiple high power fiber amplifiers or fiber lasers. System 100 includes a bundle of single-mode fibers from fiber amplifiers 10 (or fiber lasers). Fibers from amplifiers 10 are bundled in a close pack geometry, the tightest possible packing 12. With reference to FIG. 1B, shown is a cross-sectional view of fibers from fiber amplifiers 10. Fiber amplifiers 10 are fused and stretched to form tapered fiber combiner 14. With reference to FIG. 1C, shown is a cross-sectional view of stretched fiber amplifiers 10 in tapered fiber combiner 14. Tapered fiber combiner 14 is enclosed, and fused, in a glass tube 16. The tapered fiber combiner 14 and glass tube 16 form a rigid and straight fiber combiner when fused together. With reference to FIG. 1D, shown is a cross-sectional view of the tapered fiber combiner 14 fused with glass (or other material) tube 16. The tapered fiber combiner 14 may include multiples of fibers appropriate for a close packed geometry. For example, the multiples of fibers may include seven (the number of fibers needed to complete a ring around a center fiber with a close pack geometry) or nineteen fibers (the next complete ring around the first ring of seven fibers requires an additional twelve fibers). The first ring around the center fiber is depicted in of FIG. 1A.

Figure 2A:
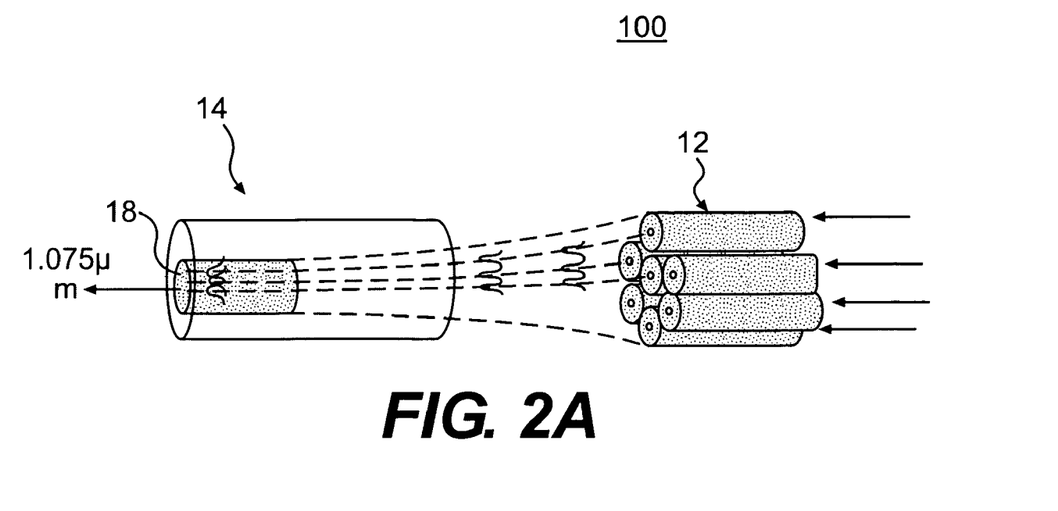
FIG. 2A shows a perspective view of an embodiment of a system for combining multiple fiber lasers or fiber amplifiers.

With reference now to FIG. 2A, shown is a perspective view of an embodiment of system 100 for combining fiber amplifiers (or fiber lasers). Beam array 12, which includes fiber amplifiers 10, is shown entering glass tube 16. Beam array 12 is fused with glass tube 16 to form tapered fiber combiner 14. Each fiber from the fiber amplifiers 10 carries a single beam of light, which is characterized by a single transverse mode (or a single mode, or more simply, mode).

Figure 2B:
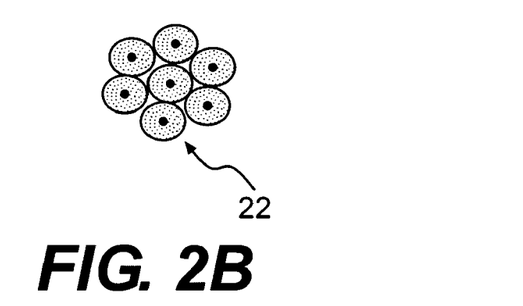
FIGS. 2B-2C show cross sectional views of a beam at start of tapered fiber combiner and at end of tapered fiber combiner, respectively.

With reference now to FIG. 2B, shown is a cross-sectional view of the footprint of modes 22 at the input end (near-field) of tapered fiber combiner 14. As shown, the diameter of the mode of each fiber amplifier in beam array 12 is relatively small compared to the diameter of each fiber amplifier.

Figure 2C:
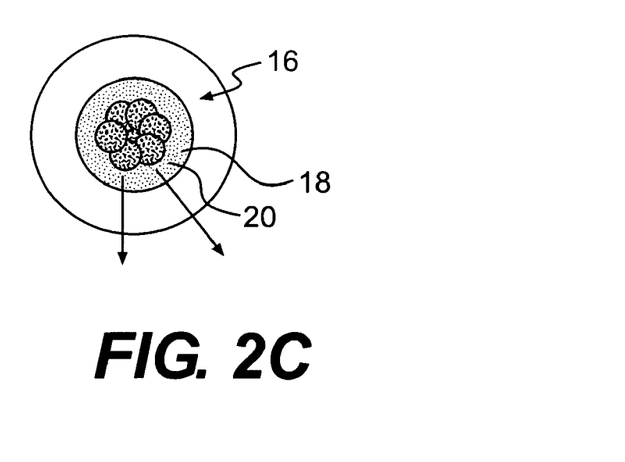

With reference now to FIG. 2C, shown is a cross-sectional view of the footprint of modes 20 at the output end 18 (far-field) of tapered fiber combiner 14. As shown, modes 20 expand in diameter to fill the cores of the fiber amplifiers 10.

Figure 3:
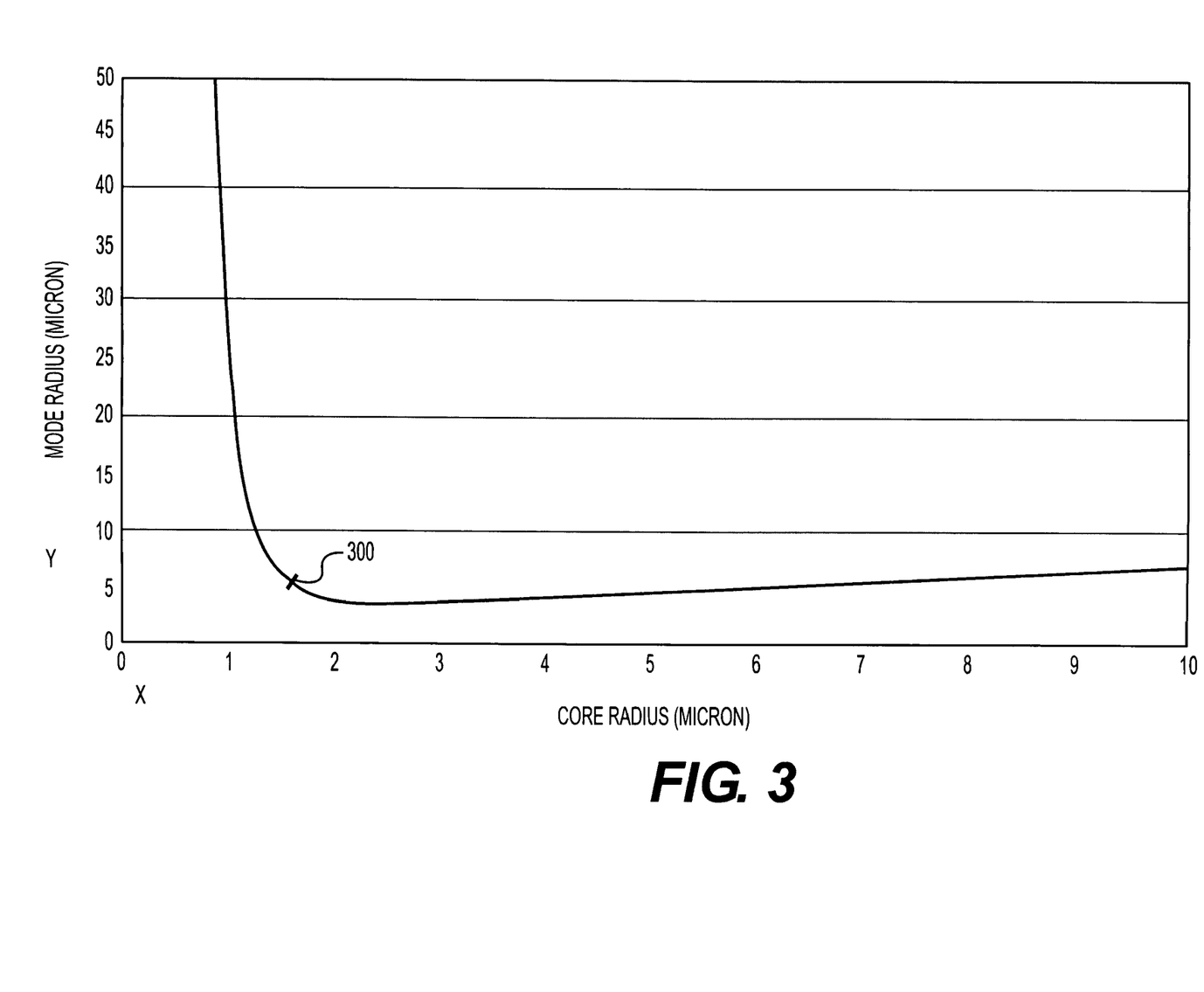
FIG. 3 shows a graph of the radius of a mode in a single-mode fiber in relation to the core radius.

It is known that a single-mode fiber supports a single guided mode regardless of the size of the core as long as the V-number is less than 2.405. The V-number is equal to $$\frac{2\pi a}{\lambda}\sqrt{n_{core}^2 - n_{clad}^2},$$

where a is the core radius, $\lambda$ is the wavelength, $n_{core}$ is the core refractive index, and $n_{clad}$ is the cladding refractive index. If the core size is reduced below an optimum number, the mean field diameter of the guided mode becomes larger (as indicated in FIG. 3). Normally, the core size is kept at an optimum value because the guided mode becomes sensitive to bends in the fiber if the core size is reduced below the optimum value. The fiber essentially becomes very lossy for fiber lengths more than a few centimeters. The losses can be avoided if the fibers are kept to a few centimeters in length and the tapered fiber segment is kept straight.

With continuing reference to FIGS. 2A-2C, when the individual beams guided by the cores are coherent and in phase with respect to each other, the modes will expand and overlap into an equivalent single beam. The size of the single beam's area is equal to the sum of the individual beam's areas. The single beam fills a single fiber array at output end 18 when the individual beams are expanded to a certain size in tapered fiber combiner 14. The expansion of the modes and the modes beginning to overlap is demonstrated by the footprint of the modes 20, shown in FIG. 2C. The modes expand to overlap to increase the fill-factor so that the far-field beam, the beam emitted from the output end of tapered fiber combiner 14, has minimal side lobes so that the output beam energy is concentrated in a central lobe. The fill-factor is a measure of how well the beams fill fiber array at output end 18. The ideal fill-factor is a fill-factor of 100%, which indicates a complete filling of the fiber array at output end 18. To combine the guided modes coherently, the guided beams are locked (i.e., the fiber amplifiers 10 are fed a common signal) to each other and should be in phase (i.e., have the same phase with respect to each other) in order to add constructively. The coherent combination of guided modes can be accomplished through passively phasing the fiber amplifiers 10. In passive phasing, a suitable feedback architecture and filtering method is used to ensure that the system runs at a wavelength such that the beams are in phase.

In an embodiment of system 100, passive phasing is used to phase the beams emitted from fiber amplifiers 10. A portion of the output beams of the individual amplifiers from fiber amplifiers 10 are fed back into tapered fiber combiner 14 so that fiber amplifiers 10 are locked together. Active phasing differs from passive phasing since fiber amplifiers 10 are locked, e.g., they are fed a common signal from a single master oscillator. In passive phasing, a single master oscillator is not needed. Filtering ensures that the outputs of the fiber amplifiers 10 are in phase. In effect, the filter favors a mode where all the beams are in phase. Passive phasing offers an advantage of providing immunity to Stimulated Brillouin Scattering (SBS). SBS occurs when intense beams (e.g., laser light) travel in a medium, such as an optical fiber, and the variations in the electric field of the beam itself produces acoustic vibrations in the medium via electrostriction. The beam may undergo SBS due to vibrations, usually in an opposite direction to the incoming beam, which reduces the power of the beam.

With reference now to FIG. 3, shown is a graph of the radius of a mode (y-axis) of a single-mode fiber in relation to the core radius (x-axis). The radius of the mode in a single-mode fiber depends on the core radius. As the core radius is decreased, the mode radius decreases up to a point 300, where it reverses trend and starts increasing if the core radius is decreased further. The equation below represents the relationship between the radius of a fiber core and the radius of the mode of the fiber where a=fiber core radius, NA=fiber numerical aperture and l=mode wavelength:

$$\text{Mode\_Radius} = a \cdot \left[ .65 + \frac{1.619}{\left(\frac{a \cdot 2 \cdot \pi}{\lambda} \cdot NA\right)^{1.5}} + \frac{2.879}{\left(\frac{a \cdot 2 \cdot \pi}{\lambda} \cdot NA\right)^{6}} \right]$$

Figure 4:
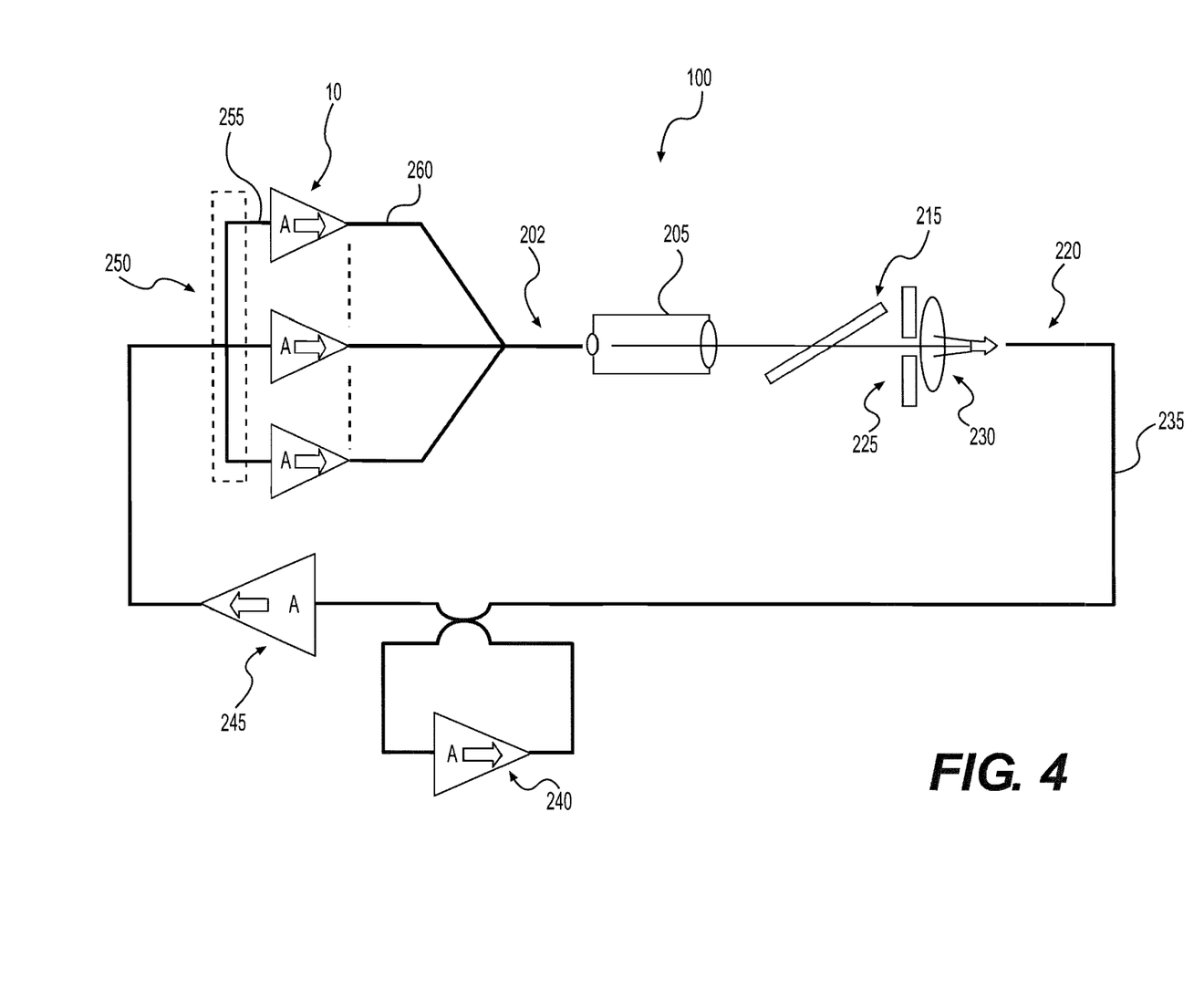
FIG. 4 shows a schematic diagram of a system for combining fiber amplifiers using a passive phasing technique.

With reference now to FIG. 4, shown is a schematic diagram of an embodiment of system 100 combining fiber amplifiers 10 using tapered fiber combiner 14. In this exemplary embodiment, a passive phasing technique using a ring feedback geometry is shown. The ring feedback geometry illustrated here does not combine multiple fiber amplifiers using collimating lenses and alignment mirrors to control beams emitted by the fiber amplifiers 10. In this embodiment, a single, tapered fiber combiner 14 is used to control the beams. In a ring feedback geometry, the output 202 of tapered fiber combiner 14 is expanded by a beam expander 205 where most of the output 202 is reflected by a high-reflectance (HR) beam splitter 215. A small portion of the output 220 is transmitted and coupled into single-mode feedback fiber 220 through coupling hole 225 and focusing lens 230. A signal from the feedback fiber 220 is mixed with output from an auxiliary laser 240 and boosted by fiber pre-amplifier 245. Boosted feedback signal 220 is split into N-beams 255 by 1×N fiber splitter 250, where N is the number of amplifiers in system 100. Each beam feeds a fiber amplifier in an array of fiber amplifiers 10. Output from individual amplifiers is combined to form tapered fiber combiner 14. Frequencies which cause the beams to be in-phase are allowed to run on fiber amplifiers 10.

With continuing reference to FIG. 4, coupling hole 225 may be placed in front of feedback fiber 220 to force system 100 to operate at a wavelength that has maximum intensity at the coupling hole 225. When system 100 operates at a wavelength that has maximum intensity at coupling hole 225, the effect is equivalent to having all the beams in phase. All the beams are in phase because maximum intensity is on the optical axis, which is defined by coupling hole 225. This mode of operation is ideal since feedback fiber's 220 signal is the strongest and dominates all other possibilities of operation. Auxiliary laser 240 is used as a protective measure to ensure that a signal to saturate the array of fiber amplifiers 260 exists even if feedback loop 235 is blocked. When feedback loop 235 is blocked and there is no signal to saturate fiber amplifiers 10, the gain of fiber amplifiers 10 becomes large enough to cause self Q-switching, or pulsating. Self Q-switching, or pulsating, is known to damage fiber amplifiers.

Figure 5A:
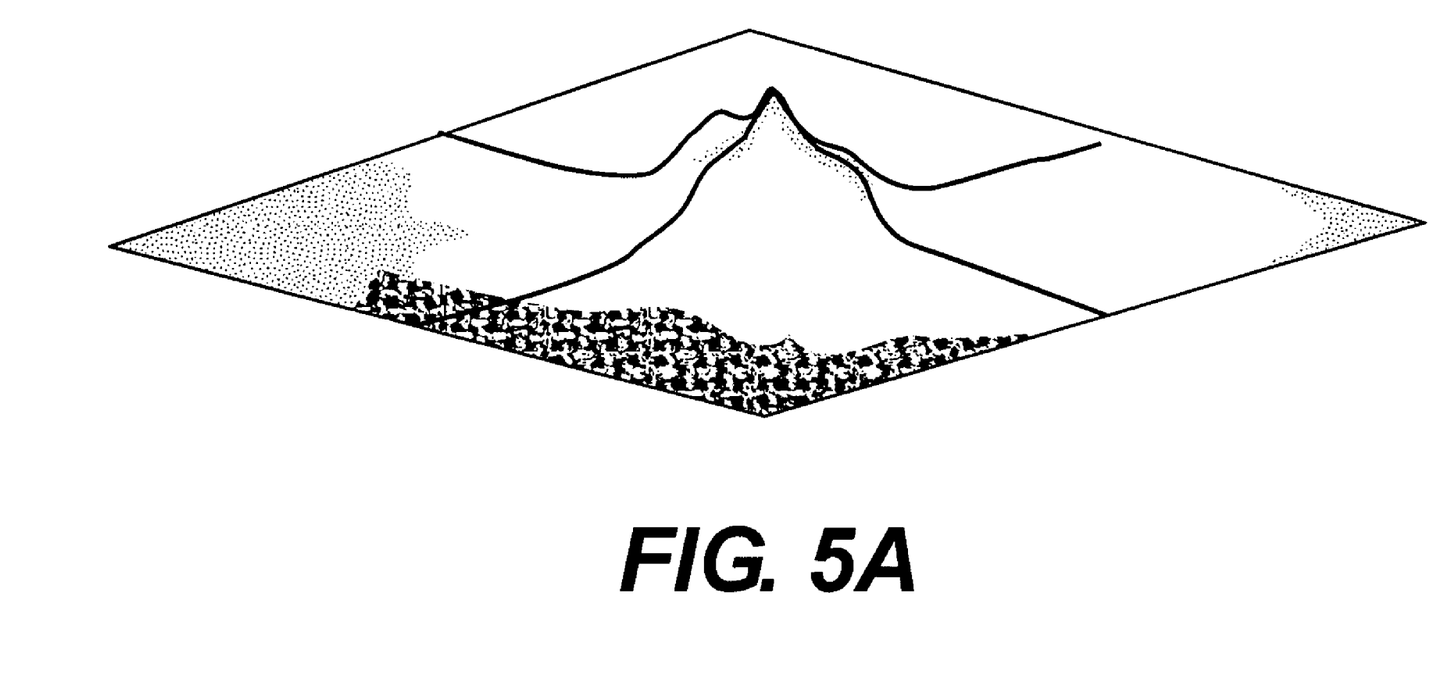
FIGS. 5A-5B show an exemplary experimental far-field beam intensity profiles for the exemplary embodiment the system of FIG. 4 with feedback blocked and feedback on, respectively.
Figure 5B:
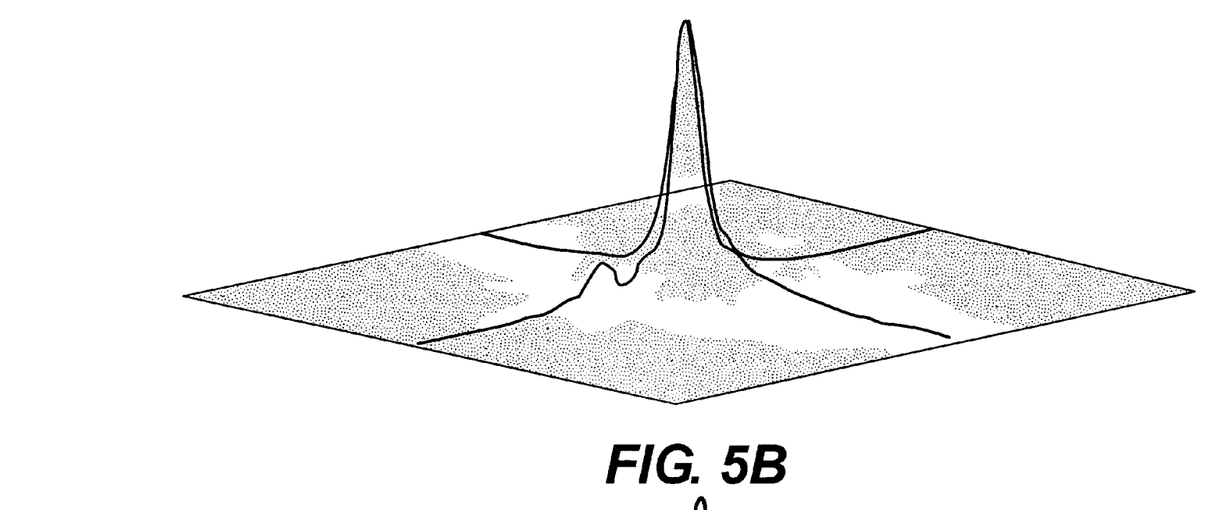
Figure 5C:
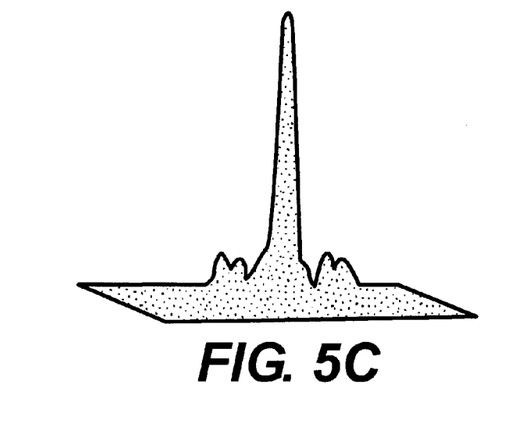
FIG. 5C, shows a theoretical far-field beam intensity profile of system for the exemplary embodiment the system of FIG. 4.

With reference now to FIG. 5A, shown is a far-field beam intensity profile of the actual experimental results of system 100. The far-field beam intensity profile of FIG. 5A shows that when feedback from beams emitted from the tapered fiber combiner 14 is blocked, the intensity drops. Referring now to FIG. 5B, shown is a far-field beam intensity profile of the actual experimental results for the system of FIG. 4 when feedback is on. As shown in FIG. 5B, the intensity of the beam is strong when feedback is on. With reference now to FIG. 5C, shown is a theoretical far-field beam intensity profile of system 100. The experimental results showing a high beam intensity shows good agreement with the theoretical profile.

Figure 6:
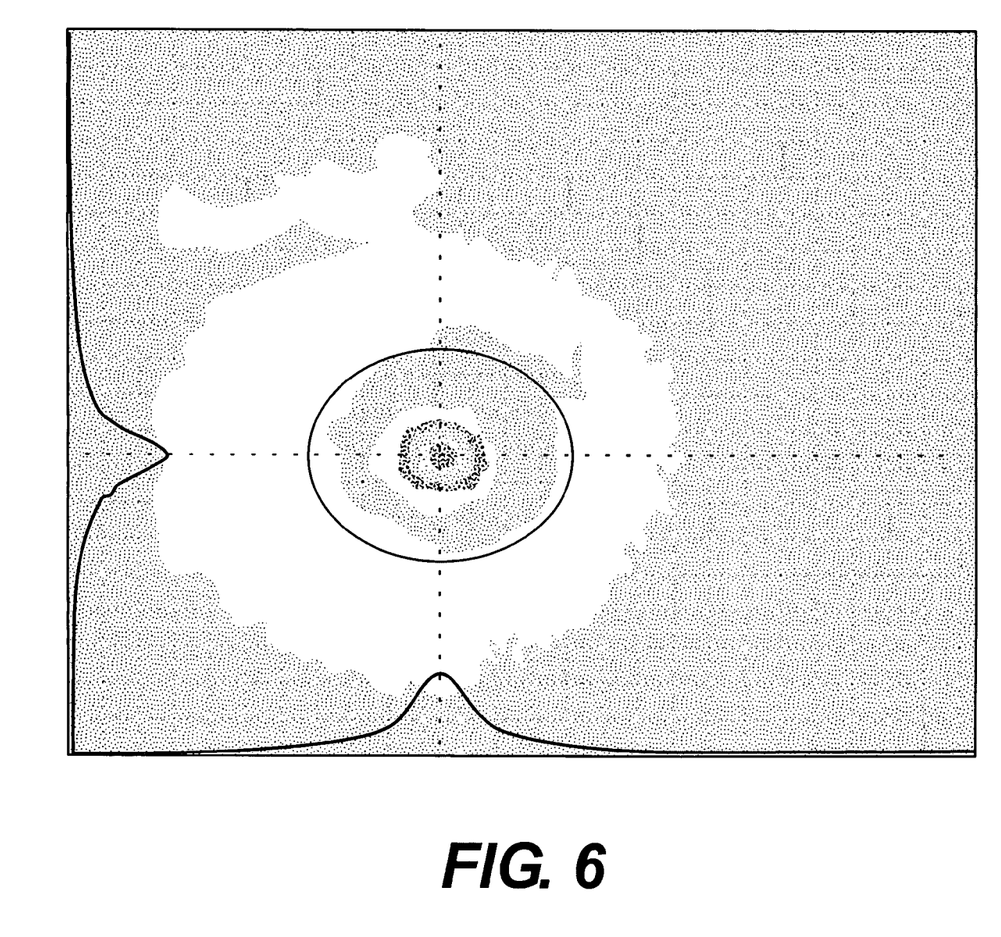

With reference now to FIG. 6, shown is a graph of a far-field beam intensity profile of the mode intensity distribution of the central core with only the central fiber turned on. The theoretical prediction (dotted line) and experimental measurement (solid line) show good agreement where the simulation parameters used were: $n_{core}$=1.48, NA=0.14, a=1.15 μm, λ=1.08 μm, θ(theory)=0.038, and θ(experiment)=0.038.

The far-field beam intensity profile of FIG. 6 was produced using the embodiment of system 100 shown in FIG. 4, and is demonstrated for relatively low powers of one watt. The system of FIG. 4 implements a passive phasing technique using a tapered fiber combiner 14 and a free space feedback signal. The method is applicable to higher power beams as well since SBS and four-wave-mixing (FWM) are not an issue for passive phasing at higher power. When high power amplifiers are used, tapered fiber combiner 14 is heat sinked to reduce energy loss at the taper in order to avoid heating tapered fiber combiner 14. The energy loss at tapered fiber combiner 14 is a result of coupling into radiation (or leaky) modes. Radiation modes are modes that leak out of the fiber. Tapered fiber combiner 14 is not harmed or heated by radiation modes because it is made of non-absorbing glass. The energy that is lost still needs to be absorbed. Therefore, a metal heat sink is effective for absorbing and removing lost radiation energy. Samples of the experiments shown in FIGS. 5-6 indicate a radiation loss smaller than one percent. The radiation loss may be minimized by strategically designing tapered fiber combiner 14. Another consideration is to keep tapered fiber combiner 14 straight to avoid energy losses due to bends in the fiber. Tapered fiber combiner 14 may be kept straight by enclosing it in a glass sleeve 16 with a refractive index similar to the refractive index of fiber cladding. The glass sleeve 16 provides mechanical rigidity to handle the tapered fiber combiner 14 and protect it from contamination.

Figure 7:
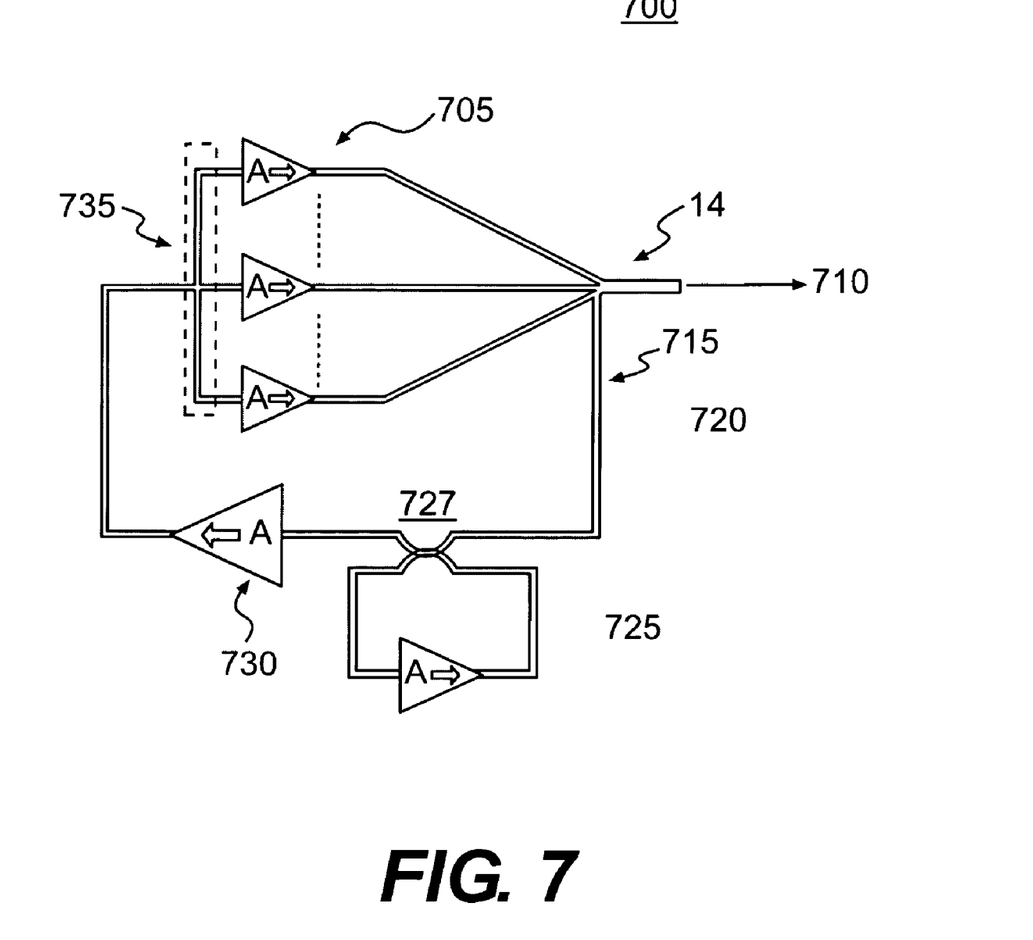
FIG. 7 shows a schematic diagram of a system for combining laser amplifiers using an all-fiber passive phasing technique.

With reference now to FIG. 7, shown is a schematic diagram of an exemplary embodiment of system 100 implementing all-fiber passive phasing using tapered fiber combiner 14. In this implementation, a feedback signal is provided by using the central, inner-most fiber 715 in the tapered fiber combiner 14, as a feedback source. Central fiber 715 originates within the array of fiber amplifiers 705 that are combined to form tapered fiber combiner 14. Tapered fiber combiner 14 captures some of the signal reflected by 4% Fresnel reflection at the facet (not shown) of the fiber combiner, to form the feedback signal 720. This results in an all-fiber passive phasing system in contrast to the implementation of FIG. 4, where the feedback signal is formed in free space. In an embodiment, feedback signal 720 is mixed with output of an auxiliary laser 725 and boosted by pre-amplifier 730. Boosted feedback signal 720 is split into N-beams by 1×N fiber splitter 727. Each beam feeds a fiber amplifier in an array of amplifiers 705. Output from the individual fiber amplifiers is combined in tapered fiber combiner 14. When the beams of the array are all in phase, they interfere to form high intensity on the axis of the array. Since the central core is situated on the axis of the array, the facet reflection signal is a maximum for wavelengths that results in all the beams being in phase. Therefore, the central fiber of the array acts both as a rejection filter against all modes which are not in phase, and also acts as a monolithic, or all-fiber, feedback fiber.

Figure 8A:
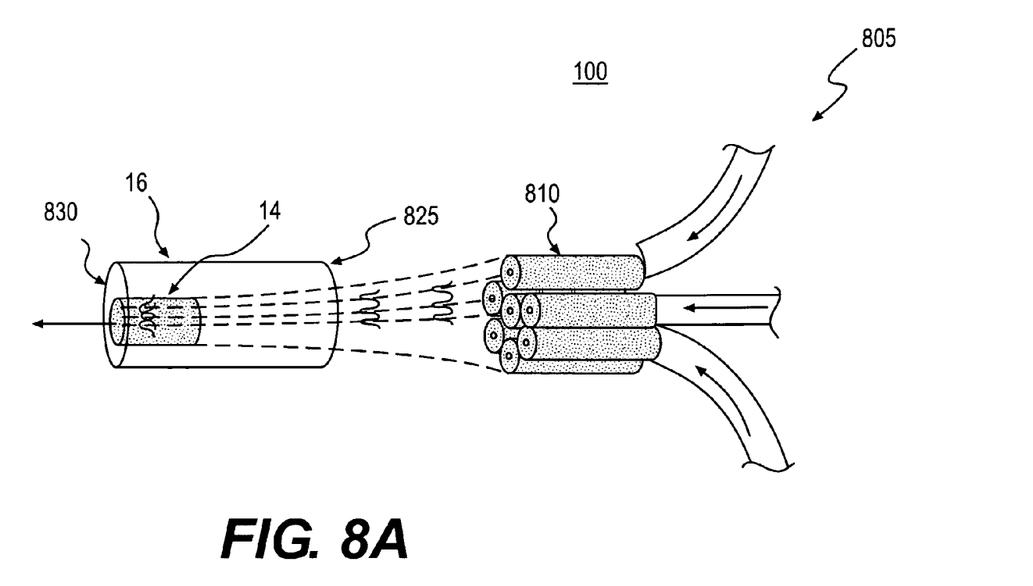
FIGS. 8A-8C show a perspective view of a system for combining high power laser fibers implementing an incoherent beam combiner; modes expanded to a diameter larger than the separation of the stretched cores; and modes sharing a single footprint, respectively.
Figure 8B:
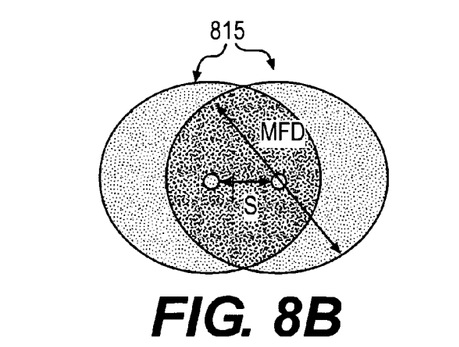
Figure 8C:
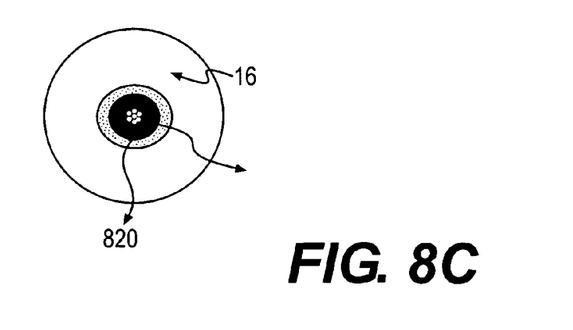

Referring now to FIG. 8A, shown is a perspective view of system 100 for combining fiber lasers using an incoherent beam combiner technique. In an embodiment, tapered fiber combiner 14 is stretched to one-fifth or smaller of its initial size. With reference to FIG. 8B, shown are modes 815 expanded to a diameter larger than the separation of the stretched cores. With reference to FIG. 8C, shown are modes 815 overlapping completely, sharing a single footprint 820. Each leg of tapered fiber combiner 14 is connected to an individual fiber laser in an array of fiber lasers 805. The individual fiber lasers that comprise the array of fiber lasers 805 operate independently, but at the same wavelength. In an embodiment, array of fiber lasers 805 are combined into a single beam at near-field (at the fiber combiner facet 825) and at far-field 830 because they essentially have the same footprint. Operating the array of fiber lasers 805 at the same wavelength allows for the maintenance of good beam quality. Good beam quality includes less diffraction. The beam quality for in an embodiment is given by the relationship:

$$M2=(1+S/MFD)2$$

Where M2 is the beam quality, S is the separation between the cores, and MFD is the mean field diameter. A beam quality of M2=1 is the ideal diffraction limited beam quality. For an essentially diffraction limited beam quality, the separation between the cores is less than the mean field diameter. This relationship between the cores and MFD is the reason why the core size needs to be reduced enough to render the MFD greater than S.

In this embodiment, a plurality of individual fiber lasers can be used instead of a plurality of fiber amplifiers. No coherence or phase relationship is required for this embodiment. Incoherent combining methods have the advantage of simplicity since no active or passive phasing is required. The difference between tapered fiber combiner 14 produced using an incoherent combining technique and tapered fiber combiner 14 produced using a coherent fiber combining technique occurs during the fusing and tapering process. During the fusing and tapering process of tapered fiber combiner 14, the bundle of fiber lasers 810 is stretched enough so that the core size becomes small enough that the mode sizes (MFD) become much larger than the separation between the cores.

Figure 9:
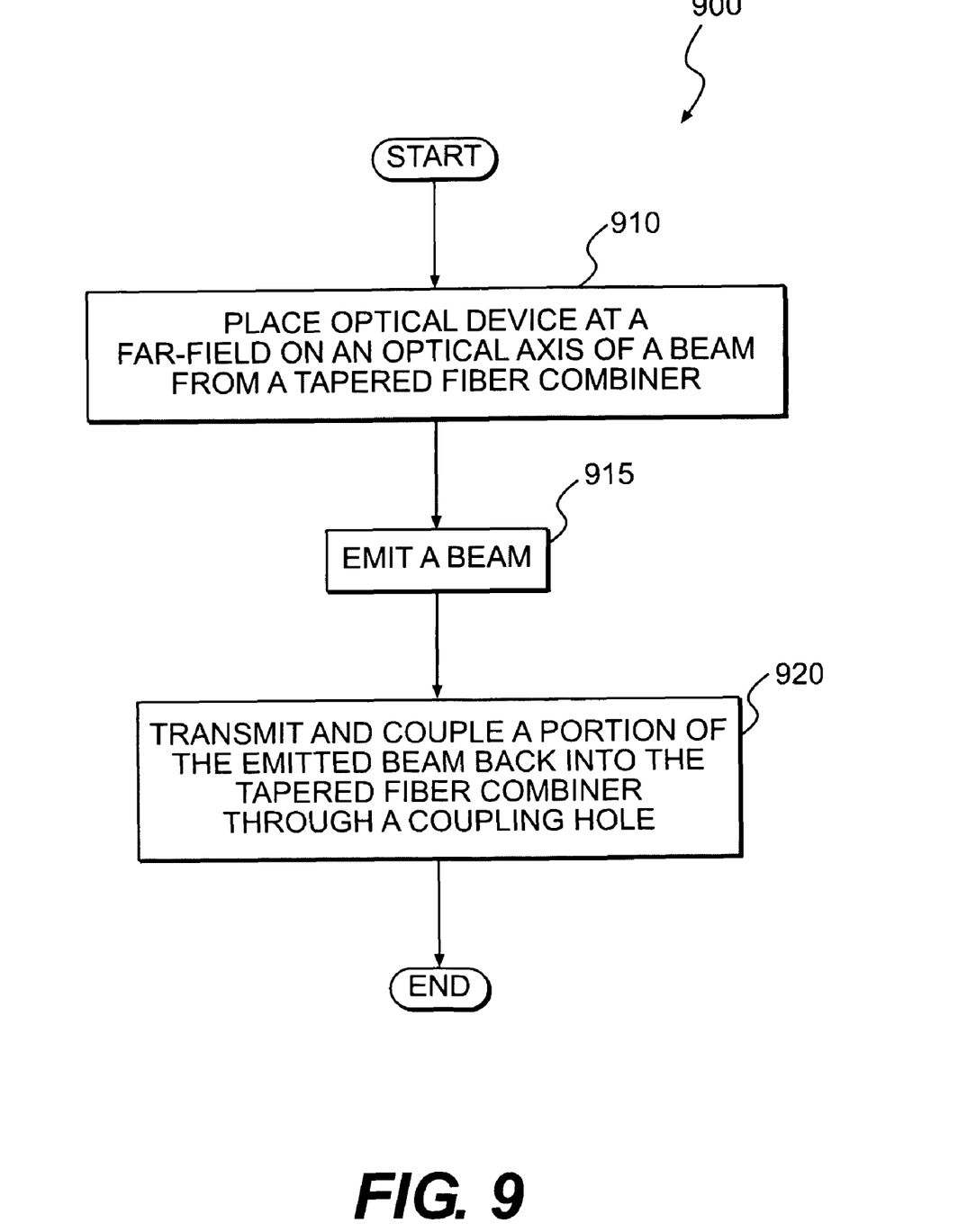
FIG. 9 shows a flow chart of an exemplary embodiment of a method for the passive phasing of fiber amplifiers using the system of FIG. 4.

Referring now to FIG. 9, shown is a flow chart of an exemplary embodiment of a method 900 for passive phasing of fiber amplifiers 10 using a ring feedback geometry. The method 900 places an optical device, such as focusing lens 230, beam expander 205, and beam splitter 215 at a far-field on an optical axis of an emitted beam 202 from tapered fiber combiner 14 (block 910). Tapered fiber combiner 14 emits beam 202 (block 915). The method then transmits and couples a portion of output (emitted beam) back into tapered fiber combiner 14 via feedback fiber 220 (which may be a single-mode feedback fiber) (block 920). Transmission and coupling of feedback fiber 220 includes mixing feedback fiber 220 with output from auxiliary laser 240 and boosting feedback fiber 220 by pre-amplifier 245. Transmission and coupling of feedback fiber 220 further includes splitting feedback fiber 220 into multiple beams (N-beams) 255 with a fiber splitter, such as a 1×N fiber splitter 250, for example. Beams 255 are fed into an array of fiber amplifiers 10. The output of individual fiber amplifiers from the array of fiber amplifiers 260 are combined to form tapered fiber combiner 14.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. A system for combining multiple fiber amplifiers comprising:
    a plurality of fiber amplifiers;
    a tapered fiber combiner formed from ends of the plurality of fiber amplifiers bundled in a close pack geometry, stretched and fused together, the tapered fiber combiner combining the beams of the fiber amplifiers into a single beam.

2. The system of claim 1 for the passive phasing of amplifiers comprising:
    an optical device;
    a beam expander;
    a beam splitter at a far-field on an optical axis of an emitted beam from a tapered fiber combiner;
    a feedback fiber for feeding into the tapered fiber combiner;
    an auxiliary laser for mixing with the feedback fiber;
    a pre-amplifier for boosting the feedback fiber; and
    a fiber splitter for splitting the feedback fiber into N-beams;
    wherein the plurality of fiber amplifiers receive the beams from the feedback fiber.

3. The system of claim 2, further comprising:
    a tube for enclosing and aligning the fiber combiner.

4. The system of claim 1 using active phasing comprising:
    an electro-optical phase modulator for correcting the phase of beams from individual amplifiers.

5. The system of claim 4, further comprising:
    a tube for enclosing and aligning the fiber combiner.

6. A system for combining multiple fiber amplifiers comprising:
    a plurality of fiber amplifiers;
    a tapered fiber combiner formed from ends of the plurality of fiber amplifiers bundled in a close pack geometry, stretched and fused together, the tapered fiber combiner combining the beams of the fiber amplifiers into a single beam,
    wherein the system uses all-fiber passive phasing and comprises:
    a feedback signal provided by the central, inner-most fiber in the array from the tapered fiber combiner;
    an auxiliary laser for mixing with the feedback fiber;
    a pre-amplifier for boosting the feedback fiber;
    a fiber splitter for splitting the feedback fiber into a plurality of beams; and
    an array of fiber amplifiers for receiving the beams from the feedback fiber.

7. The system of claim 6, further comprising:
    a tube for enclosing and aligning the fiber combiner.

8. The system of claim 1 wherein the tube is comprised of glass.

9. The system of claim 2 wherein the fiber splitter is a 1×N fiber splitter.

10. A method for combining fiber amplifiers comprising:
    emitting a beam from a tapered fiber combiner;
    placing an optical device, beam expander, and beam splitter, at a far-field on an optical axis of an emitted beam from the tapered fiber combiner;
    transmitting and coupling a portion of the emitted beam back into the fiber combiner via a feedback fiber;
    mixing the feedback fiber with output of an auxiliary laser;
    boosting the feedback fiber by a pre-amplifier;
    splitting the feedback fiber into a plurality of beams by a fiber splitter;
    feeding the beams into an array of fiber amplifiers; and
    combining the output of the individual fiber amplifiers in the tapered fiber combiner.

* * * * *